A. M. SOSA.
VARIABLE SPEED MECHANISM.
APPLICATION FILED OCT. 3, 1910.

1,068,013.

Patented July 22, 1913.

2 SHEETS—SHEET 1.

A. M. SOSA.
VARIABLE SPEED MECHANISM.
APPLICATION FILED OCT. 3, 1910.
1,068,013.
Patented July 22, 1913.
2 SHEETS—SHEET 2.
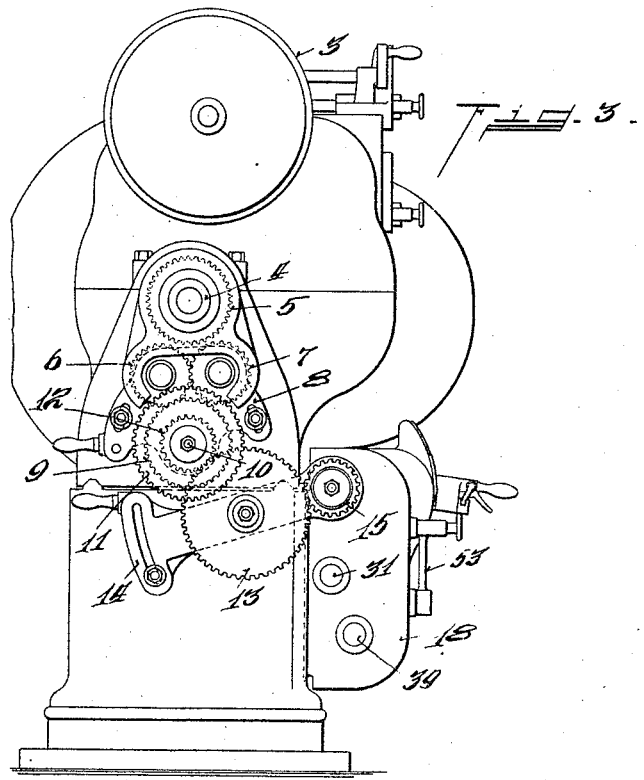
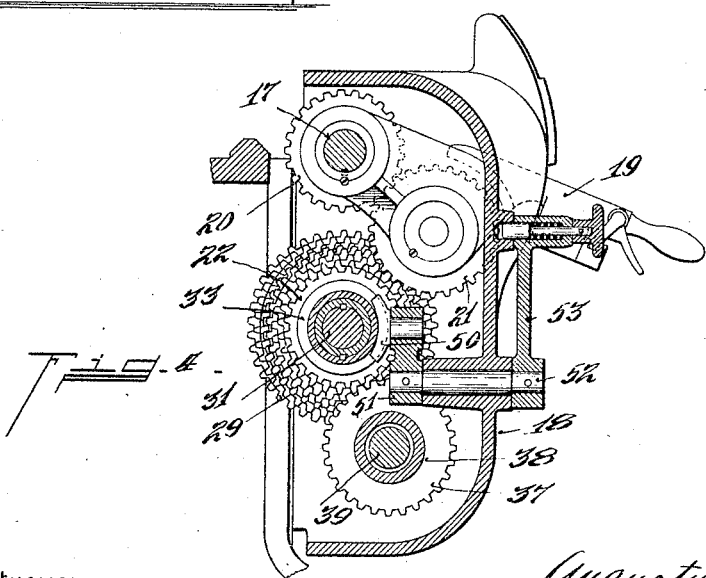
Witnesses
Inventor
Augustus M. Sosa
By Wood & Wood.
Attorneys

UNITED STATES PATENT OFFICE.

AUGUSTUS M. SOSA, OF CINCINNATI, OHIO, ASSIGNOR TO THE AMERICAN TOOL WORKS COMPANY, OF CINCINNATI, OHIO, A CORPORATION OF OHIO.

VARIABLE-SPEED MECHANISM.

1,068,013.            Specification of Letters Patent.       Patented July 22, 1913.

Application filed October 3, 1910. Serial No. 585,145.

*To all whom it may concern:*

Be it known that I, AUGUSTUS M. SOSA, a citizen of the United States, residing at Cincinnati, in the county of Hamilton and State of Ohio, have invented certain new and useful Improvements in Variable-Speed Mechanism, of which the following is a specification.

My invention relates to an improvement in variable speed mechanism, primarily employed for controlling the feed of a machine tool, and as illustrated, it is employed in connection with the feed screw of a lathe.

One of the objects of my invention is to provide a variable speed system of gearing, between the driving and driven shafts, and clutching mechanism, for controlling the driving connection therewith, and secondary systems of gearing interposed between said first-named system and driven shaft, for producing a multiple range of speeds of the first system.

Another object of my invention is to provide a variable speed system of gearing of the cone and tumbler type between the driving and driven elements, comprising a primary speed changing system, and clutching means for controlling the same, whereby the primary train is thrown into direct connection with the driven element.

Another object of my invention is to provide a variable speed system of gearing of the cone and tumbler type, between the driving and driven elements, comprising a primary and a series of secondary speed changing trains, clutching means for controlling the same, in combination with an interchangeable system of gearing, for varying the ratio of speed to the driving element.

Another object of my invention is to provide variable speed mechanism, primarily of the cone and tumbler type, employing a primary range of varying speeds, between the driving and driven elements in direct connection therewith, for transmitting the heaviest pressures, the power traveling in its shortest line, and a multiple series adapted to be thrown into operative condition with the first, and producing a multiple range thereof, for transmitting the lighter loads.

Various other features are more fully set forth in the description of the accompanying drawings, forming a part of this specification, in which:—

Figure 1:
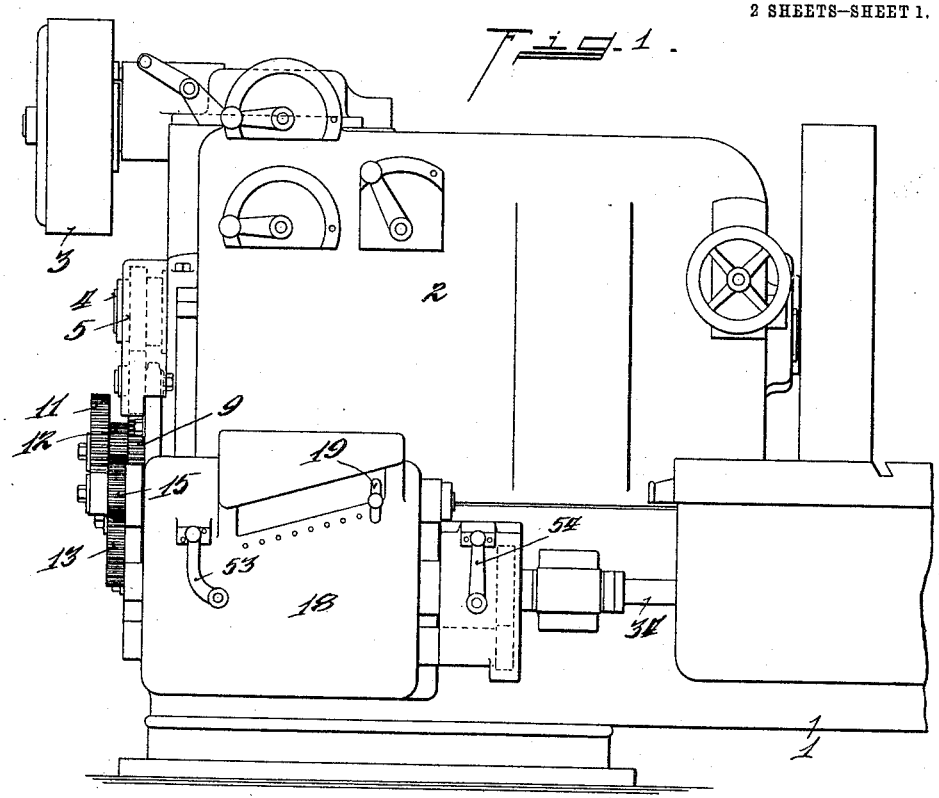
Figure 2:
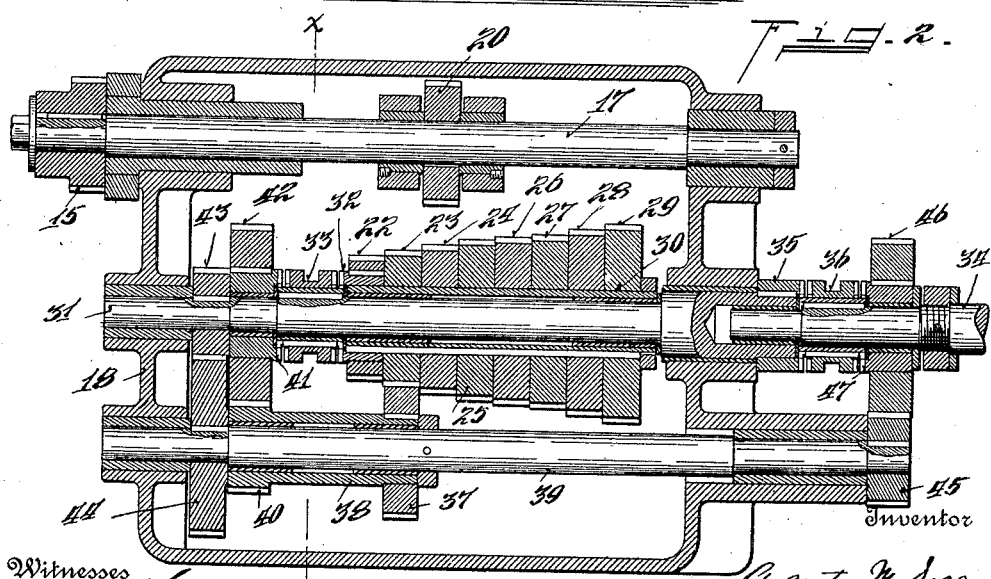

Figure 1 is a front elevation of the headstock portion of the lathe, with my improvement applied. Fig. 2 is a central vertical section of the mechanism forming the features of this invention. Fig. 3 is an end elevation of the lathe, illustrated in Fig. 1. Fig. 4 is a section on line $x$, $x$, Fig. 2.

In employing my variable speed system of gearing as tool feeding means, as few working gears as possible are employed in transmitting the heaviest pressures to the feed screw, for feeding the tool and for cutting coarse pitches, where considerable power is required. The finer pitches are produced through a secondary speed changing system, which speeds are the multiples of the first. For instance, in the primary system, the fundamental coarsest series of one, three, five and seven threads per inch are obtained, and by uniting the primary and a secondary system, the speeds are multiplied, and a finer series, such as two, six, ten and fourteen threads per inch are obtained. Thus, the feeds requiring the heaviest power are transmitted solely through the primary system, increasing the efficiency materially.

1 represents the lathe bed.
2 represents the headstock.
3 represents the main driving pulley, for transmitting motion to the lathe spindle 4.

The system of gearing or driving connection between the main driving pulley 3 and spindle, are not herewith illustrated, and any conventional type of head-stock may be employed in connection with my invention, when the same is applied to a lathe.

5 represents a gear, fixed to the spindle 4, and 6, 7, represent intermediate gears journaled upon the rock plate 8, adapted to be alternately thrown into mesh with the gear 5. Gears 6, 7, are intermeshed and gear 6 is in mesh with a gear 9, mounted upon a stud shaft suitably supported upon the frame of the head-stock. Thus, when the swinging frame 8 is adjusted, so as to intermesh gear 6 with gear 5, forward rotation is imparted to the gear 9, and when the swinging plate is adjusted to bring gear 7 into mesh with gear 5, reverse rotation is imparted to gear 9, from gear 5, through gears 7 and 6.

11, 12, represent a series of interchangeable gears, mounted upon the stud shaft 10, adapted to be selectively intermeshed with gear 13, mounted upon the swinging quadrant 14, see Fig. 3.

15 represents a gear fixed to the shaft 17, said shaft being suitably journaled in the gear casing 18, supported on the bed of the lathe, in this instance, and for the purposes of this invention, it may be termed as the driving shaft. The transmitting mechanism, above described, is auxiliary thereto and forms a driving train between said shaft 17 and the lathe spindle.

19 represents a tumbler lever slidable on shaft 17 for sliding gear 20 and supporting gear 21. The gear 20 is splined on the shaft 17 and in mesh with gear 21, and gear 21 is adapted to be engaged selectively with any one of the gears 22, 23, 24, 25, 26, 27, 28 and 29, comprising members of a cone of gears which are fixed upon the sleeve 30. The sleeve 30 being loosely mounted on the shaft 31. Gear 22 of the series is an end gear and is provided with the clutch teeth 32, adapted to intermesh with the teeth of the clutch member 33, fixed to the shaft 31.

34 represents the feed screw or driven shaft, and as illustrated, its end telescopically engages with the end of the shaft 31 and freely journals therein, the shaft 31, in this instance, serving as a bearing therefor.

35 represents a clutch member, fixed to the shaft 31, adapted to be engaged by the sliding clutch member 36, fixed to the screw or driven shaft 34.

The clutch members 33 and 36, are each preferably splined upon a sleeve or bushing keyed to their respective shaft. The sleeves are utilized to prevent lateral movement of the part adjacent thereto. Thus, when clutch member 33 is engaged with the gear 22, of the cone, all the cone gears are in driving connection with shaft 31, and when clutch member 36 is in engagement with the clutch member 35, they are in direct connection with the shaft 34, forming the primary system of speed change. In this instance, eight changes of speed can be had between shaft 17 and 34, through the tumbler gearing and cone, with the cone directly connected to the driven shaft.

A second system of speed ratios, multiples of the first are obtained by the following instrumentalities:—37 represents a gear, fixed upon the sleeve 38, said sleeve in turn being loosely mounted on the shaft 39. The shaft 39 is journaled within bearings formed in the casing 18, and serves as an intermediate for conveying motion from shaft 31 to shaft 34 when clutch member 36 is disengaged from the clutch member 35. The sleeve 38 is provided with a gear 40, in mesh with a gear 42, loose upon shaft 31, said gear is provided with the clutch teeth 41, adapted to be intermeshed or engaged with the clutch member 33. Thus, when clutch member 33 is engaged with clutch teeth 41, of gear 42, and clutch member 36 engaged with shaft 31, a second series of speed ratios, multiples of a number of speeds obtainable from the primary system or cone and tumbler gearing is imparted to shaft 34, as follows:—Through one member of the cone of gearing or unitary series of gears imparting motion thereto thence from gear 23 as a member of the cone through gear 37, sleeve 38, gears 40, 42, and shafts 31 and 34. A third and fourth range can be obtained by shifting the clutch members 33 and 36 selectively through another series of gears between the shaft 31 and shaft 34, or directly from the cone through shaft 31 and 34 in direct connection, each resultant to the number of gears of the cone. Each clutch is movable to alternate positions of activity, with each change defining a variety of speeds equal in number to the number of gears of the cone.

A third range can be had through the cone as an intermediate and changing element, as follows:—43 represents a gear, fixed to shaft 31, in mesh with a gear 44, fixed to the shaft 39, preferably at one end thereof, and 45 represents a gear, likewise fixed to shaft 39, at the opposite end, in mesh with a gear 46, loosely mounted upon shaft 34, and provided with a clutch member or teeth 47, adapted to be engaged by the clutch member 36. Thus, by throwing clutch member 33, into driving connection with the gears of the cone, and clutch member 36 into driving connection with gear 46, motion will be imparted from the cone, through shaft 31, gears 43, 44, shaft 39, gears 45 46, to the driven or screw shaft 34, and the range of variations is likewise equal in number to the number of steps or gears of the cone.

The fourth range is obtained by bringing clutch member 33 into engagement with the gear 42, and with the clutch member 36 in the position described for the third range, that of being in engagement with gear 46, in which instance, the motion will be imparted from the tumbler gearing or primary system, through gear 37, sleeve 38, gears 40 and 42, and clutch mechanism connecting said gear 42 to the shaft 31, thence through gears 43, 44, shaft 39, gears 45, 46, and the clutch mechanism connecting gear 46 to shaft 34. Consequently with eight gears as members of the cone, there are thirty-two changes obtainable in the organization herein illustrated.

The tumbler lever 19 projects through an angular slot in the casing 18, and is provided with the usual form of spring controlled detent to be inserted into the orifices respectively alined with the gears of the cone, to properly locate the same and maintain the lever in its adjusted position.

The clutch members 33, 36, are actuated in the usual manner, and, as illustrated, in Fig. 4, 50 represents a crescent projected into an annular groove, formed in the clutch member 33, and pivotally mounted upon an arm 51, said arm being fixed to shaft 52, journaled in bearings in the casing 18; and 53 represents a hand lever fixed to the shaft 52, and provided with a spring controlled detent, for locking the clutch in any one of its adjusted positions. The hand lever 54 controls the clutch member 36, and is of similar construction as that described for the controlling means for clutch member 33. By this system it will be seen, that four distinct variations can be had, one in direct connection with the driven element, as a primary, and three additional for each gear of the cone, with the cone as an intermediate.

With my variable speed system, represented as the feeding mechanism for a screw-cutting lathe, the primary feeds for cutting the coarse threads, of one, three, five and seven, can be produced, employing a secondary train, a finer series, such as two, six, ten and fourteen may be had, and with the third system, a still finer series as four, twelve, twenty and twenty-eight, with the latter two series, as multiples of the primary.

Having described my invention, I claim:—

1. A device of the nature disclosed combining a first shaft and a second shaft axially alined, a transmission member of different diameters capable of being connected to said first shaft, a driving member arranged so that it may coöperate with the different diameter elements of said transmission member, a series of gears as intermediates between said member and first shaft capable of being connected with said first shaft, means for alternately connecting said member to said first shaft primarily and through said series of gears secondarily, a second series of gears as intermediates between said first shaft and second shaft capable of being connected to said shafts, and means for alternately connecting said first and second shafts primarily and through said second series of gears secondarily.

2. A device of the nature disclosed combining a first and second shaft, a transmission member capable of being connected to said first shaft, a series of gears as intermediates between said member and first shaft capable of being connected with said first shaft, means for alternately connecting said member to said first shaft directly primarily and through said series of gears secondarily, a second series of gears as intermediates between said first shaft and second shaft capable of being connected to said shafts, and means for alternately connecting said first and second shafts primarily and through said second series of gears secondarily.

3. In a device of the nature disclosed comprising a first shaft, a driven shaft adjacently alined therewith, a unitary series of different diameter gears loose on said first shaft, a driving shaft, tumbler gear mechanism for rotatively connecting said driving shaft selectively with any one of said series of gears, a gear independent of said series normally loose on said first shaft, gearing connecting said gear with one gear of said unitary series, clutch mechanism movable to connect said unitary series and independent gear alternately to said first shaft, a gear on said driven shaft, gearing connecting said first shaft with said gear on the driven shaft, clutch mechanism movable to alternate positions to connect said last named gear to the driven shaft, or said driven shaft to the first shaft, with both clutch mechanisms correlatively functioning to impart a variety of speeds to said driven shaft, one for each clutch active position times the number of gears comprised in the unitary series.

4. In a device of the nature disclosed comprising a first shaft, a unitary series of different diameter gears on said shaft, a driving shaft, interchangeable gearing between said driving shaft and series of gears adapted to selectively connect with one of them, an intermediate series of gears between said unitary series of gears and first shaft, clutch mechanism engaged with said first shaft for alternately connecting said unitary series of gears primarily with the first shaft and through the intermediate series secondarily, a driven shaft adjacently alined with said first shaft, a series of gears as intermediates between said first shaft and driven shaft, and clutch mechanism movable to alternate positions engaged with said driven shaft for connecting said first and driven shaft primarily, and through said intermediate gearing secondarily, whereby each active position of each of said clutch mechanisms defines a speed ratio for each member of the unitary series.

5. In a variable speed mechanism, a driving shaft, a second shaft, a cone of gears loose on said second shaft, gearing for connecting said driving shaft selectively with the cone of gears on the second shaft, a third shaft axially alined with the second shaft, clutching mechanism for connecting said second and third shafts, clutching mechanism for connecting the cone of gears and the second shaft, a train of gears between the second and third shafts in driving connection with the second shaft, said first named clutching mechanism adapted to connect said gears with the third shaft, whereby in one position of said clutching mechanism one series of variable speeds is obtainable through the cone of gears and second and third shafts and in a second position of said clutching mechanism a second number of speeds are obtainable through the cone of gears, and train of gears between said second and third shafts.

6. In a variable speed mechanism, two shafts axially alined, a cone of gears loose upon the first of said shafts, a driving shaft, means for connecting any one of the cone gears to the driving shaft, a gear loose on said first shaft, a train of gears in driving connection with one of the gears of the cone and intermeshed with the loose gear, clutching mechanism for alternately clutching the cone of gears and the loose gear to the first shaft, a second train of gears in loose connection with the second shaft, a second gear fixed on said first shaft intermeshed with the second gear train, clutching mechanism for alternately clutching the first shaft and the second gear train in driving connection with the second shaft, whereby by the manipulation of said clutching mechanisms the cone of gears can be thrown into direct driving connection with said first and second shafts as a primary speed range, and with said first and second trains for secondary ranges of speeds through the cone of the primary, producing four speeds for each member of the cone of gears.

7. In a variable speed mechanism, a first shaft and a second shaft, a first series of gears loose on said first shaft, a driving member arranged to coöperate with any one of said first series of gears, a gear loose on said first shaft, a second series of gears connecting said first series of gears and said gear, clutching mechanism concentric with said first shaft adapted to alternately connect said first series of gears and said loose gear to said first shaft, whereby in one instance said first series of gears are in direct connection with said first shaft, and secondly through said second series of gears, a third series of gears between said first and second shafts, clutching mechanism concentrically connected with said second shaft for connecting said first and second shafts in one position, and connecting said third series of gears and second shaft in a second position.

In testimony whereof, I have hereunto set my hand.

AUGUSTUS M. SOSA.

Witnesses:
  OLIVER B. KAISER,
  LOUISE BECK.

---

Copies of this patent may be obtained for five cents each, by addressing the "Commissioner of Patents, Washington, D. C."